(12) United States Patent
Shinoda et al.

(10) Patent No.: US 10,261,490 B2
(45) Date of Patent: Apr. 16, 2019

(54) SERVOMOTOR CONTROL DEVICE, SERVOMOTOR CONTROL METHOD, AND COMPUTER READABLE RECORDING MEDIUM

(71) Applicant: FANUC CORPORATION, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/899,572

(22) Filed: Feb. 20, 2018

(65) Prior Publication Data

US 2018/0246491 A1    Aug. 30, 2018

(30) Foreign Application Priority Data

Feb. 24, 2017 (JP) .................. 2017-033386

(51) Int. Cl.

| G05D 23/275 | (2006.01) |
|---|---|
| G05B 19/19 | (2006.01) |
| G05B 11/01 | (2006.01) |
| G05B 13/02 | (2006.01) |
| G05B 19/404 | (2006.01) |

(52) U.S. Cl.
CPC .......... G05B 19/195 (2013.01); G05B 11/011 (2013.01); G05B 13/024 (2013.01); G05B 19/404 (2013.01); G05B 2219/41092 (2013.01); G05B 2219/41138 (2013.01); G05B 2219/41164 (2013.01)

(58) Field of Classification Search
CPC ............... G05B 19/195; G05B 11/011

USPC ......................................................... 318/632
See application file for complete search history.

(56) References Cited

FOREIGN PATENT DOCUMENTS

| JP | H01-230108 A | 9/1989 |
|---|---|---|
| JP | 2004-274989 A | 9/2004 |
| JP | 2009-181242 A | 8/2009 |
| JP | 2013-092986 A | 5/2013 |

(Continued)

OTHER PUBLICATIONS

An Office Action; "Notification of Reasons for Refusal," issued by the Japanese Patent Office dated Sep. 11, 2018, which corresponds to Japanese Patent Application No. 2017-033386 and is related to U.S. Appl. No. 15/899,572; with English language translation.

*Primary Examiner* — Erick D Glass
(74) *Attorney, Agent, or Firm* — Studebaker & Brackett PC

(57) ABSTRACT

A servomotor control device includes: a driven body configured to be driven by a servomotor; a connection mechanism configured to connect the servomotor and the driven body; a position command generation unit configured to generate a position command value; a motor control unit configured to control the servomotor using the position command value; a force estimation part configured to estimate a force estimated value which is a drive force acting on the driven body at a connecting part with the connection mechanism; a force estimated value output part configured to decide on reflection of updating and interruption of updating of a force estimated value based on the position command value, and output either of a force estimated value reflecting updating, or a force estimated value of when interrupting updating; and a compensation amount generation part configured to generate a compensation amount for compensating the position command value.

8 Claims, 14 Drawing Sheets

(56) References Cited

FOREIGN PATENT DOCUMENTS

| | | |
|---|---|---|
| JP | 2014-013554 A | 1/2014 |
| JP | 2014-087880 A | 5/2014 |
| JP | 2014-109785 A | 6/2014 |

SERVOMOTOR CONTROL DEVICE, SERVOMOTOR CONTROL METHOD, AND COMPUTER READABLE RECORDING MEDIUM

This application is based on and claims the benefit of priority from Japanese Patent Application No. 2017-033386, filed on 24 Feb. 2017, the content of which is incorporated herein by reference.

BACKGROUND OF THE INVENTION

Field of the Invention

The present invention relates to a servomotor control device having a function of compensating the position of a driven body that is driven by the power of a servomotor, a servomotor control method, and a computer readable recording medium.

Related Art

Conventionally, there are servomotor control devices that mount a workpiece (work) on a table, and cause the table to move via a connection mechanism by a servomotor. The table and workpiece are driven bodies. The connection mechanism has a coupling which is connected to the servomotor, and a ball screw which is fixed to the coupling. The ball screw is threaded to a nut. Among such servomotor control devices, there is a servomotor control device having a function of compensating the position of the driven body (also referred to as mobile body) that is driven by the power of the servomotor.

For example, Patent Document 1 describes a servomotor control devices that estimates the drive force acting on a driven body at a connecting part of a connection mechanism, and compensates the position command value based on the estimated drive force.

Patent Document 2 describes a servomotor control device that calculates an expansion/contraction amount of a ball screw based on the distance from the servomotor to a moving body and a torque command value, calculates a position compensation amount for the mobile body which is threaded to the ball screw based on this expansion/contraction amount, and then compensates the position command value according to this position compensation amount.

In addition, Patent Document 3 describes a servomotor control device that calculates the expansion/contraction amount of the ball screw based on the tension acting on the distal side from the servomotor of the ball screw, the distance between a pair of fixing parts supporting the ball screw at both ends, the distance from the fixing part provided to the proximal side of the servomotor to the mobile body, and the torque command given to the servomotor, and then calculates the position compensation amount of a feed shaft, based on the calculated expansion/contraction amount of the ball screw.

Patent Document 1: Japanese Unexamined Patent Application, Publication No. 2014-109785
Patent Document 2: Japanese Unexamined Patent Application, Publication No. 2014-13554
Patent Document 3: Japanese Unexamined Patent Application, Publication No. 2014-87880

SUMMARY OF THE INVENTION

The present inventors have found that, in the case of compensating the position command value, during stop or low-speed operation, a compensation reacting to the drive force estimated and unrelated to the mechanical operation is applied to the position command value, whereby oscillation of the compensation amount arises. The present invention has an object of providing a servomotor control device for a machine tool or industrial machine capable of position control of a driven body with higher precision, a servomotor control method, and a computer readable recording medium.

According to a first aspect of the present invention, a servomotor control device includes: a servomotor (e.g., the servomotor 50 described later);
a driven body (e.g., the table 70 described later) configured to be driven by the servomotor;
a connection mechanism (e.g., the coupling 601 and ball screw 602 described later) configured to connect the servomotor and the driven body to transfer power of the servomotor to the driven body;
a position command generation unit (e.g., the position command generation unit 10 described later) configured to generate a position command value for the driven body;
a motor control unit (e.g., the motor control unit 20 described later) configured to control the servomotor using the position command value;
a force estimation unit (e.g., the force estimation part 302 described later) configured to estimate a force estimated value which is drive force acting on the driven body at a connecting part with the connection mechanism;
a force estimated value output unit (e.g., the force estimated value output part 303 described later) configured to decide on reflection of updating or interruption of updating of the force estimated value based on the position command value, and configured to output either a force estimated value reflecting updating, or a force estimated value of when interrupting updating based on the position command value; and
a compensation amount generation unit (e.g., the compensation amount generation part 301 described later) configured to generate a compensation amount for compensating the position command value using output of the force estimated value output unit.

According to a second aspect of the present invention, in the servomotor control device as described in the first aspect, the force estimated value output unit may decide on interruption of updating of the force estimated value which was estimated by the force estimation unit, in a case of a command velocity of the position command value or a command acceleration of the position command value becoming no more than a predetermined value.

According to a third aspect of the present invention, in the servomotor control device as described in the first or second aspect, the force estimated value output unit, in a case of a command velocity of the position command value or a command acceleration of the position command value becoming no more than a predetermined value, may define a predetermined force estimated value range with a basis of the force estimated value of when interrupting updating, and if the force estimated value outputted from the force estimation unit is within the force estimated value range, may output the force estimated value of when interrupting updating.

According to a fourth aspect of the present invention, in the servomotor control device as described in any one of the first to third aspects, the compensation amount generation unit may define, as the compensation amount, a sum of: a product of a first coefficient and the force estimated value outputted from the force estimated value output unit; and a product of the force estimated value outputted from the force estimated value output unit, a distance from the servomotor to the coupling part, and a second coefficient.

According to a fifth aspect of the present invention, in the servomotor control device as described in the third aspect, the force estimated value range may provide respectively different force estimated value ranges relative to an increasing and decreasing directions of the force estimated value, with a basis of the force estimated value of when interrupting updating.

According to a sixth aspect of the present invention, the servomotor control device as described in any one of the first to fifth aspects may further include: a switching unit (e.g., the switch 304 described later) configured to switch from the force estimated value outputted from the force estimated value output unit to a force estimated value which was estimated by the force estimation unit, in a case of a command velocity or command acceleration of the position command value generated by the position command generation unit exceeding a predetermined value.

According to a seventh aspect of the present invention, in the servomotor control device as described in any one of the first to sixth aspects, when the force estimated value output unit switches a force estimated value to be outputted, between a force estimated value reflecting updating and a force estimated value of when interrupting updating based on the position command value, or when the switching unit switches a force estimated value to be outputted, between a force estimated value outputted from the force estimated value output unit and a force estimated value outputted from the force estimation unit, a filter may filter to the compensation amount generated by the compensation amount generation unit.

According to an eighth aspect of the present invention, in the servomotor control device as described in any one of the first to seventh aspects, the motor control unit may include a velocity command creation part (e.g., the velocity command creation part 201 described later) and a torque command creation part (e.g., the torque command creation part 202 described later),
in which the torque command creation part has an integrator (e.g., the integrator 2021 described later) configured to integrate at least velocity error, and
When the force estimated value output unit switches a force estimated value to be outputted, between a force estimated value reflecting updating and a force estimated value of when interrupting updating based on the position command value, or when the switching unit switches a force estimated value to be outputted, between a force estimated value outputted from the force estimated value output unit and a force estimated value outputted from the force estimation unit, may perform overwriting of the integrator may be performed.

According to a ninth aspect of the present invention, in a servomotor control method for a servomotor control device including: a servomotor (e.g., the servomotor 50 described later);
a driven body (e.g., the table 70 described later) configured to be driven by the servomotor; and
a connection mechanism (e.g., the coupling 601 and ball screw 602 described later) configured to be connect the servomotor and the driven body to transfer power of the servomotor to the driven body,
the method includes the steps of:
generating a position command value for the driven body;
estimating a force estimated value which is a drive force acting on the driven body at a connecting part with the connection mechanism;

deciding on reflection of updating or interruption of updating of the force estimated value based on the position command value, and selecting either of a force estimated value reflecting updating, or a force estimated value of when interrupting updating based on the position command value;
compensating the position command value thus generated, based on the force estimated value thus selected; and
controlling the servomotor using the position command value thus compensated.

According to a tenth aspect of the present invention, a non-transitory computer readable recording medium is encoded with a program for servomotor control that causes a computer to execute servomotor control of a servomotor control device including: a servomotor (e.g., the servomotor 50 described later);
a driven body (e.g., the table 70 described later) configured to be driven by the servomotor; and
a connection mechanism (e.g., the coupling 601 and ball screw 602 described later) configured to connect the servomotor and the driven body to transfer power of the servomotor to the driven body, the program causing the computer to execute processing of:
generating a position command value for the driven body;
estimating a force estimated value that is a drive force acting on the driven body at a connecting part with the connection mechanism;
deciding on reflection of updating or interruption of updating of the force estimated value based on the position command value, and selecting either of a force estimated value reflecting updating, or a force estimated value of when interrupting updating based on the position command value;
compensating the position command value thus generated, based on the force estimated value thus selected; and
controlling the servomotor using the position command value thus compensated.

According to the present invention, high-precision position control of a driven body becomes possible which suppresses oscillation of the compensation amount arising due to compensation reacting to the estimated drive force and unrelated to mechanical operation being added to the position command value.

DETAILED DESCRIPTION OF THE INVENTION

Figure 1:
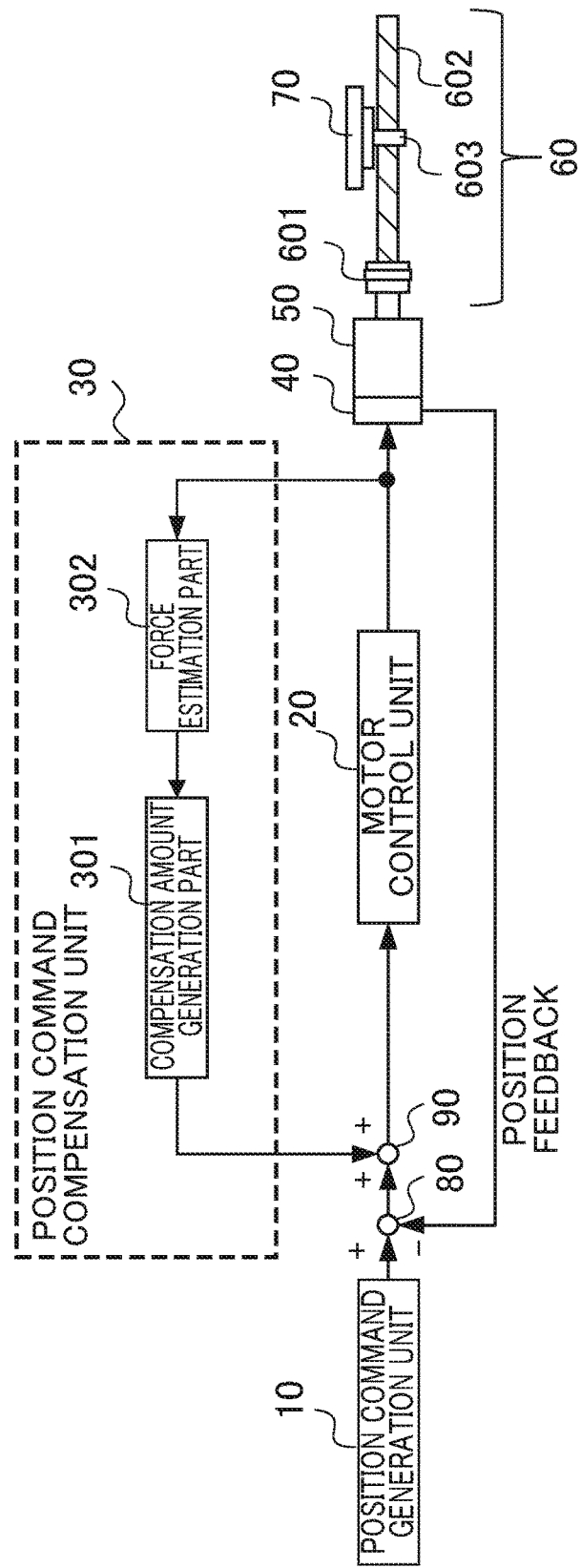
FIG. 1 is a block diagram showing the configuration of a servomotor control device serving as a technical premise.

Hereinafter, an embodiment of the present invention will be explained using the drawings. First, a servomotor control device serving as a technical premise will be explained prior to the explanation of the embodiment of the present invention. FIG. 1 is a block diagram showing the configuration of a servomotor control device serving as the technical premise. The servomotor control device causes the table 70 to move via the connection mechanism 60 by way of the servomotor 50. A tool machines the workpiece (work) mounted on the table 70. The connection mechanism 60 has a coupling 601 connected to the servomotor 50, and a ball screw 602 fixed to the coupling 601, in which a nut 603 is threaded with the ball screw 602. By way of rotational driving of the servomotor 50, the nut 603 threaded on the ball screw 602 moves in the axial direction of the ball screw 602. The nut 603 serves as a connecting part between the connection mechanism 60 and the table 70.

The rotation angle position of the servomotor 50 is detected by an encoder 40 associated with the servomotor 50 and serving as a position detection unit, and the detected rotation angle position (which becomes as a position detected value) is used as a position feedback. It should be noted that the encoder 40 is capable of detecting the rotational velocity, and the detected velocity (which becomes a velocity detected value) can be used as a velocity feedback. The servomotor control device has a position command generation unit 10 that creates a position command value for the servomotor 50 following a program and/or command inputted from a higher-order control device, external input device, etc. which is not illustrated, a subtracter 80 for obtaining a difference between the position command value created by the position command generation unit 10 and the position detection value detected by the encoder 40, an adder 90 that adds this difference and the compensation value outputted from the position command compensation unit 30, a motor control unit 20 that creates a torque command value for the servomotor 50 using this addition value, and a position command compensation part 306.

During driving of the servomotor 50, the drive force acts on the connection mechanism 60 and table 70, whereby the connection mechanism 60 and table 70 elastically deform. Since the connection mechanism 60 has low rigidity compared to the table 70 serving as a driven body, the elastic deformation of the connection mechanism 60 accounts for a proportion which is the majority of the overall elastic deformation. When the connection mechanism 60 elastically deforms, even in a case of the servomotor control device causing the servomotor 50 to rotate according to the command value, error in the amount of the elastic deformation amount arises in the position of the table 70. For this reason, in order to eliminate this error, the position command value is compensated by the amount of the elastic deformation amount of the connection mechanism 60. The elastic deformation amount of the connection mechanism 60 is proportional to the drive force acting on the table 70 at the nut 603 serving as the connecting part between the table 70 and the connection mechanism 60, and the drive force can be expressed by the drive torque acting on the connecting part.

The position command compensation unit 30 has a compensation amount generation part 301 and force estimation part 302. The force estimation part 302 estimates the drive force (drive torque) acting on the driven body at the connecting part using the torque command value. The compensation amount generation part 301 generates a compensation amount for compensating the positional error based on the drive force estimated by the force estimation part 302, and outputs the compensation value. The positional error is the difference between the position command value generated by the position command generation unit 10 and the position feedback.

Figure 2:
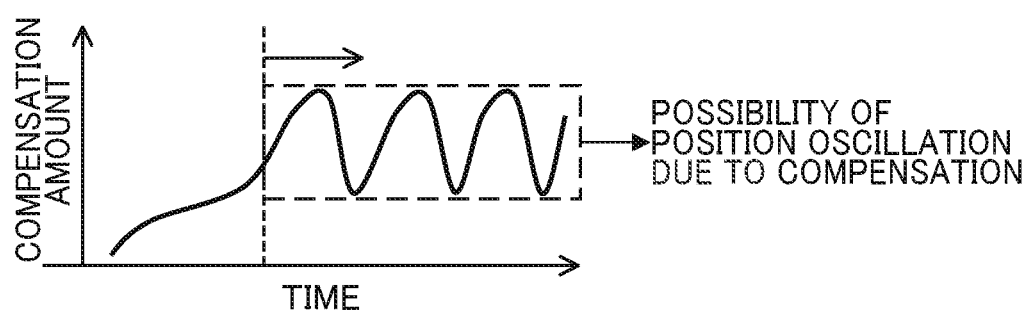
FIG. 2 is a graph for explaining oscillation of a compensation amount.

The present inventors have found that, in the servomotor control device which is the technical premise shown in FIG. 1, even during stop or low-speed operation, there is a case where compensation reacting to the drive force estimated and unrelated to the mechanical operation is applied to the position command value, and oscillation of the compensation amount occurs as shown in FIG. 2. The present inventors have found that, if interrupting the updating of the force estimated value outputted from the force estimation unit during stop or low-speed operation, it is possible to suppress oscillation of the compensation amount.

Hereinafter, an embodiment of the servomotor control device of the present invention that suppresses oscillation of the compensation amount will be explained. The mechanism to which the servomotor control device of the present embodiment explained below is applied is a machine tool such as a laser beam machine, electrical discharge machine or cutting machine; however, the servomotor control device of the present invention is applicable to industrial machinery, etc. such as robots.

First Embodiment

Figure 3:
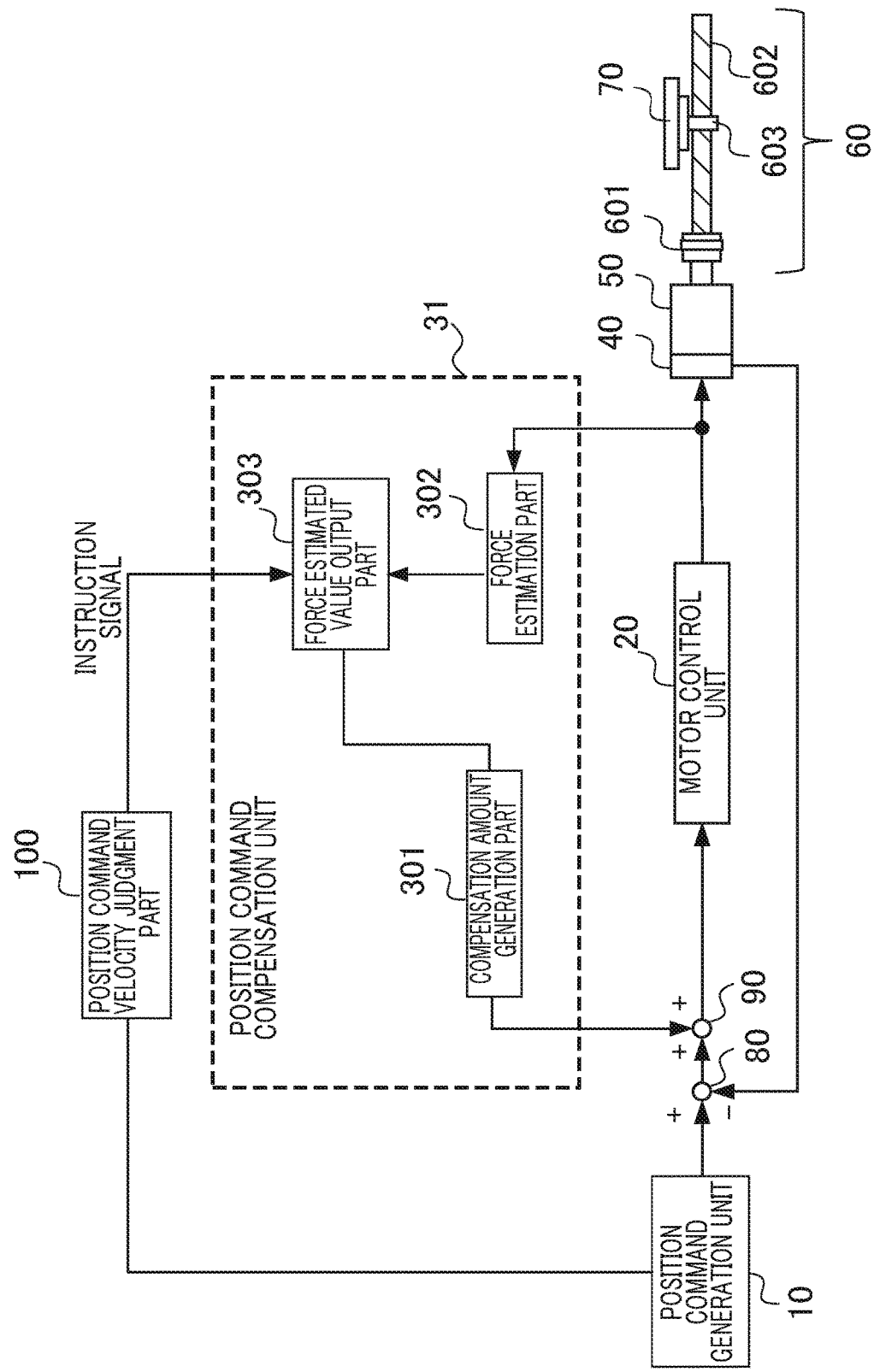
FIG. 3 is a block diagram showing the configuration of a servomotor control device according to a first embodiment of the present invention.
Figure 4:
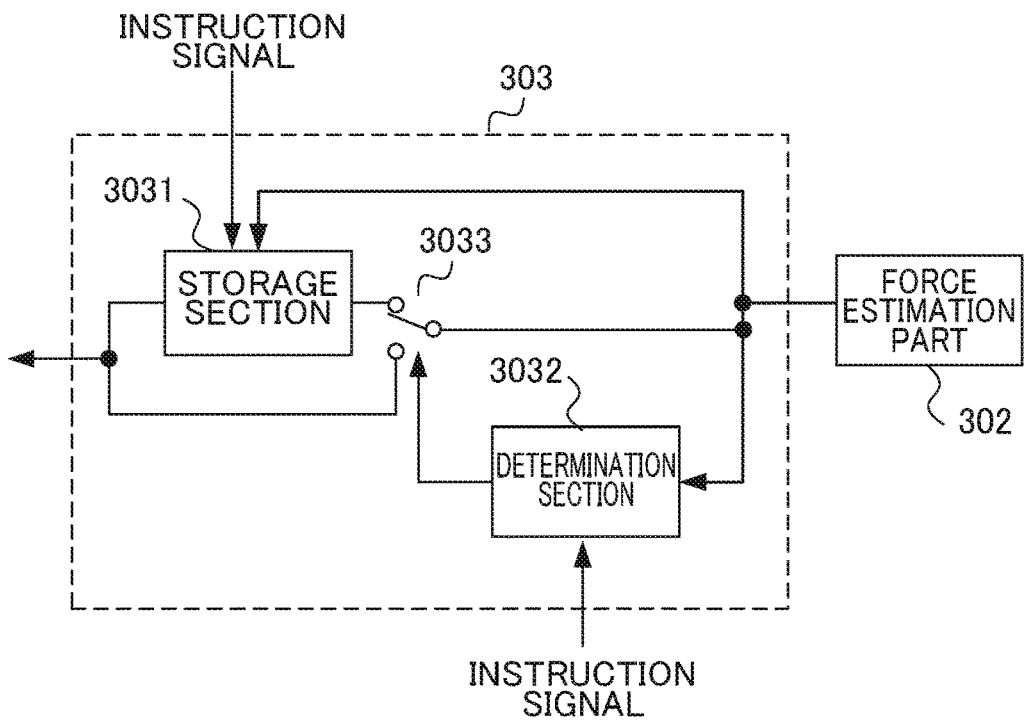
FIG. 4 is a block diagram showing the configuration of a force estimated value output part of FIG. 3.

FIG. 3 is a block diagram showing the configuration of a servomotor control device serving as a first embodiment of the present invention. FIG. 4 is a view showing one configuration example of a force estimated value output part. In FIG. 3, the same reference symbols are attached for constitutional members that are identical with constitutional members of the servomotor control device in FIG. 1, and explanations thereof will be omitted. As shown in FIG. 3, the servomotor control device of the present embodiment includes a position command compensation unit 31 in place of the position command compensation unit 30, and includes a position command velocity judgment part 100. The position command compensation unit 31 includes a force estimated value output part 303, compared to the position command compensation unit 30 shown in FIG. 1. As shown in FIG. 1, the force estimated value output part 303 includes a determination section 3032 and switch 3033.

The position command velocity judgment part 100 receives a position command value created by the position command creation unit 10, and generates a command velocity of the position command value (which becomes a position command velocity). The position command velocity judgment part 100 judges whether the absolute value for the generated command velocity is no more than a predetermined value (including 0), and sends an instruction signal to a storage section 3031 and determination section 3032 of the force estimated value output part 303. When the absolute value for the command velocity is no more than the predetermined value (including 0), it is possible to judge that the servomotor control device is performing control for during stop or low-speed. It should be noted that, although the position command velocity judgment part 100 judges whether the absolute value for the command velocity is no more than the predetermined value (including 0) herein, the position command velocity judgment part 100 may perform only the generation of the command velocity, and the determination section 3032 and storage section 3031 may judge whether the absolute value for the command velocity is no more than the predetermined value (including 0) based on the command velocity received from the position command velocity judgment part 100. One of the determination section 3032 and storage section 3031 may judge whether the absolute value for the command velocity is no more than the predetermined value (including 0) based on the command velocity received from the position command velocity judgment part 100, and send the instruction signal to the other thereof.

The force estimated value output part 303 judges the reflection of updating or interruption of updating of the force estimated value from the force estimation part 3032 based on the instruction signal, and outputs either the force estimated value reflecting the updating (force estimated value outputted from the force estimation part 302) or the force estimated value of when interruption the updating based on the instruction signal (force estimated value stored in the storage section 3031). The storage section 3031 of the force estimated value output part 303, if receiving the instruction signal from the position command velocity judgment part 100, stores the force estimated value from the force estimation part 302 (which becomes the estimated load torque), when the instruction signal indicates that the absolute value for the command velocity is no more than the predetermined value. The stored force estimated value corresponds to the force estimated value during stop or low-speed.

The determination section 3032 receives the instruction signal from the position command velocity judgment part 100, and when the instruction signal indicates that the absolute value for the command velocity is no more than the predetermined value, sets a predetermined force estimated value range (range of predetermined dead band) with the force estimated value from the force estimation part 302 (which becomes roughly the same force estimated value as the force estimated value stored in the storage section 3031) as a basis. Subsequently, the determination section 3032 determines whether the force estimated value inputted next from the force estimation part 302 is within the predetermined force estimated value range. If the force estimated value is within the predetermined force estimated value range, the determination section 3032 switches the switch 3033 so that the input side of the storage section 3031 and output side of the force estimation part 302 are connected, and outputs the output instruction signal to the storage section 3031. The storage section 3031 having received the output instruction signal outputs the stored force estimated value to the compensation amount generation part 301.

On the other hand, if the inputted force estimated value is not within the predetermined force estimated value range, the determination section 3032 switches the switch 3033 so that the input side of the compensation amount generation part 301 and the output side of the force estimation part 302 are connected. The force estimated value inputted to the switch 3033 is then outputted to the compensation amount generation part 301. When the instruction signal indicates that the absolute value for the command velocity is not no more than the predetermined value (absolute value for the command velocity exceeds the predetermined value), the determination section 3032 switches the switch 3033 so that the input side of the compensation amount generation part 301 and the output side of the force estimation part 302 are connected.

By configuring in this way, in the case of the force estimated value from the force estimation part 302 (which becomes the estimated load torque) being within the predetermined force estimated value range (within range of dead band), the compensation amount generation part 301 generates a compensation amount for the compensation of elastic deformation, and outputs to the adder 90, with the force estimated value stored in the storage section 3031 as the estimated load torque. On the other hand, the compensation amount generation unit 301, in the case of the force estimated value from the force estimation part 302 (which becomes the estimated load torque) being outside the predetermined force estimated value range, generates a compensation amount for compensation of elastic deformation, and outputs to the adder 90, with the force estimated value acquired in real-time from the force estimation part 302 as the estimated load torque.

The command acceleration of the position command value may be used in place of the command velocity of the position command value, and in this case, the position command velocity judgment part 100 is replaced by a position command acceleration judgment part which receives the position command value created by the position command generation unit 10, and generates a command acceleration for the position command value (position command acceleration). The functions of the position command acceleration judgment part are the same as the functions of the position command velocity judgment unit 100, except for the point of replacing the command velocity with the command acceleration. It should be noted that, although the switch 3033 is switched based on the position command velocity or position command acceleration herein, so long as stop or low-speed operation can be detected based on the position command, the switch 3033 may be switched using a position command in place of the position command velocity or position command acceleration. The force estimation part 302 estimates and outputs the drive force (drive torque) acting on the driven body at the connecting part using the torque command value outputted from the motor control unit 20, as already explained. The value of this estimated load torque is the force estimated value. It should be noted that the estimation of the drive force is not limited thereto, and the force estimation part may estimate the drive force by further adding acceleration/deceleration torque, disturbance torque, etc., or may estimate the drive force by calculating the motor torque using the output of an electric current detection part detecting the motor current, rather than the torque command value.

Figure 5:
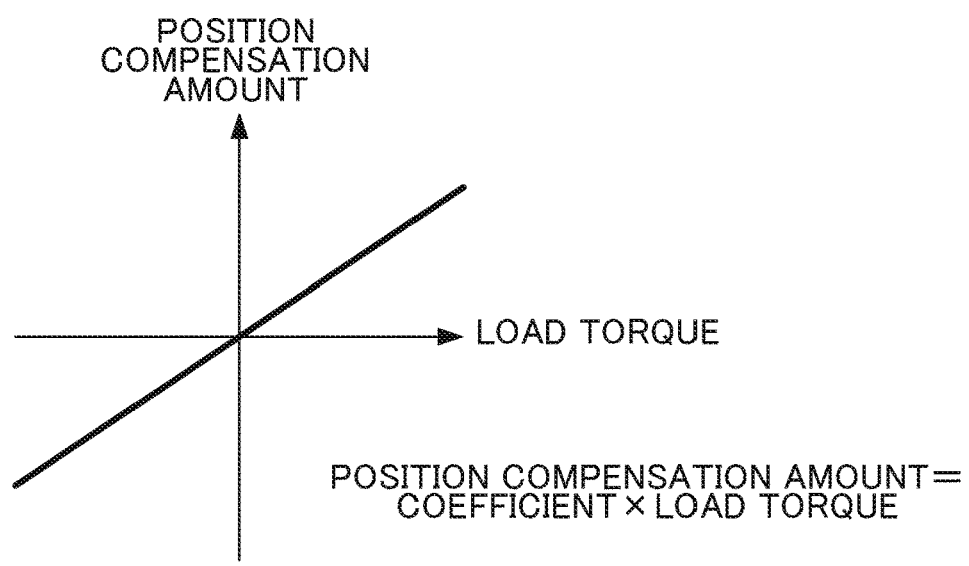
FIG. 5 is a characteristic chart showing operation of the servomotor control device shown in FIG. 1.
Figure 6:
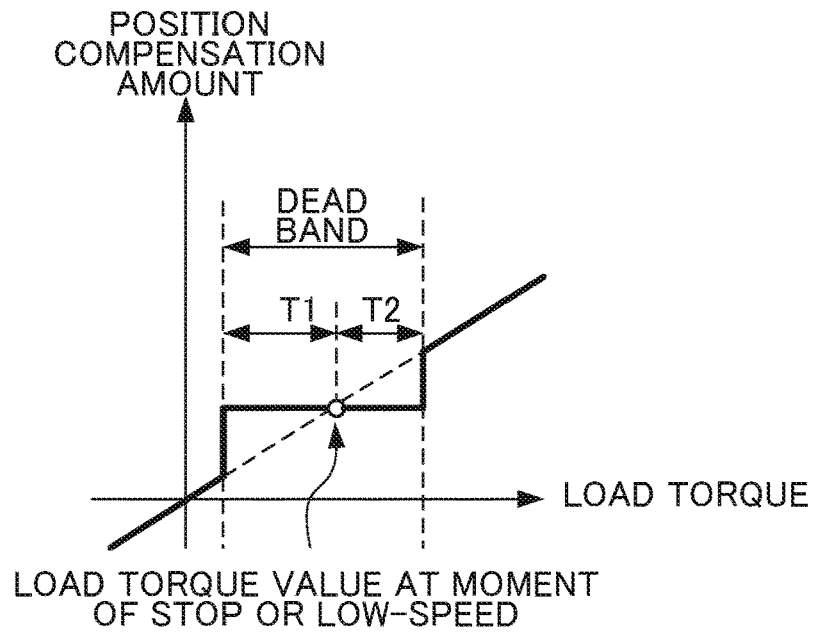
FIG. 6 is a characteristic chart showing operation of the servomotor control device shown in FIG. 3.
Figure 7:
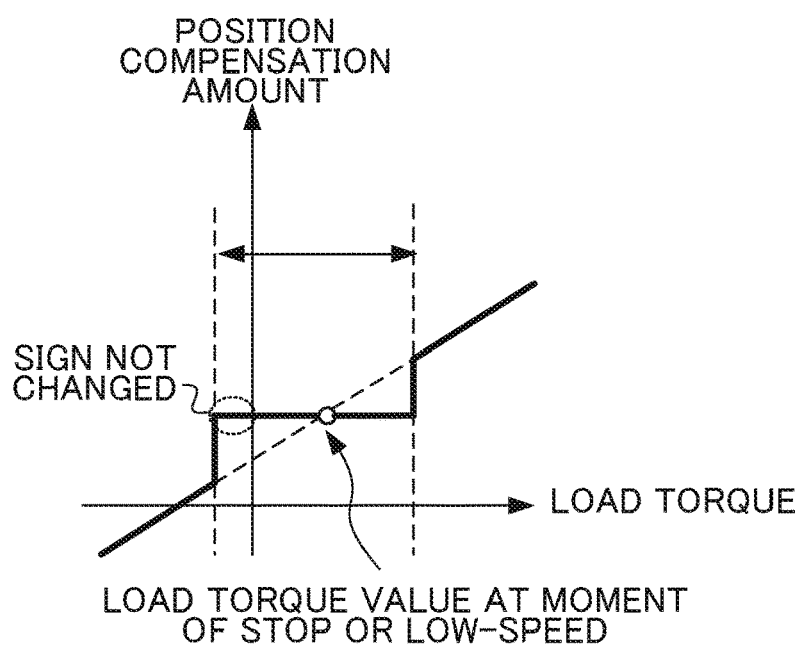
FIG. 7 is a characteristic chart showing operation of the servomotor control device shown in FIG. 3.

Hereinafter, the actions of the servomotor control device of the present embodiment will be explained using the characteristic charts of FIGS. 5, 6 and 7. In the case of the servomotor control device shown in FIG. 1 not taking account of the influence of the length of the ball screw, the load torque and compensation amount are in a proportional relationship as shown in FIG. 5, and the position compensation amount is obtained by the equation of position compensation amount=coefficient×load torque; therefore, when the load torque changes during stop of commands, the position compensation amount also changes.

In the present embodiment, in the case of the command velocity or command acceleration of the position command value becoming no more than a predetermined value, the predetermined dead band with the basis of the load torque value (which becomes a force estimated value) at the moment becoming no more than the predetermined value, i.e. load torque value during stop or when at low-speed, is provided relative to the load torque outputted from the force estimation part 302. In this dead band, the compensation amount generation part 301 performs compensation based on the estimated value (load torque) during stop or when at low-speed outputted from the storage section 3031 of the force estimated value output part 303. Unnecessary changes in the compensation amount due to minute changes in load torque during stop or when at low-speed are thereby prevented. In the case of a change exceeding the predetermined dead band occurring in the load torque outputted from the force estimation part 302, the compensation amount generation part 301 performs compensation of the position command based on the force estimated value outputted from the force estimation part 302. Upon the compensation amount generation part 301 performing compensation of the position command based on the force estimated value outputted from the force estimated part 302, in the case of becoming a load torque falling into the width of the dead band again, the predetermined dead band is provided relative to the load torque outputted from the force estimation part 302. This repetition is performed. The width of the dead band may not be equal relative to the increasing/decreasing directions from the load torque value during stop or when at low-speed. In other words, the width T1, T2 relative to the increasing/decreasing directions from the load torque value during stop or when at low-speed may be T1=T2, may be T1>T2, or may be T1<T2. Although there are cases of the sign of the load torque value during stop or when at low-speed changing due to some influence (for example, the load torque value changes from positive to negative), even in this case, the sign for the estimated load torque during stop or when at low-speed does not change as shown in FIG. 7.

As explained above, in the present embodiment, the predetermined force estimated value range (range or predetermined dead band) is provided during motor stop or when at low-speed, relative to the estimated load torque for calculating the elastic deformation of the mechanism such as the ball screw, and in the case of the force estimated value from the force estimation unit 302 being in this predetermined force estimated value range, updating of the load torque is interrupted. The compensation amount generation part 301 generates the compensation amount using the predetermined force estimated value (force estimated value stored in the storage section) for which updating was interrupted, and avoids excessive correction. According to the present embodiment, the servomotor control device is able to perform only compensation related to lost motion, without reflecting changes in minute compensation amounts during stop or when at low-speed, which are unrelated to operation of the servomotor.

Figure 8:
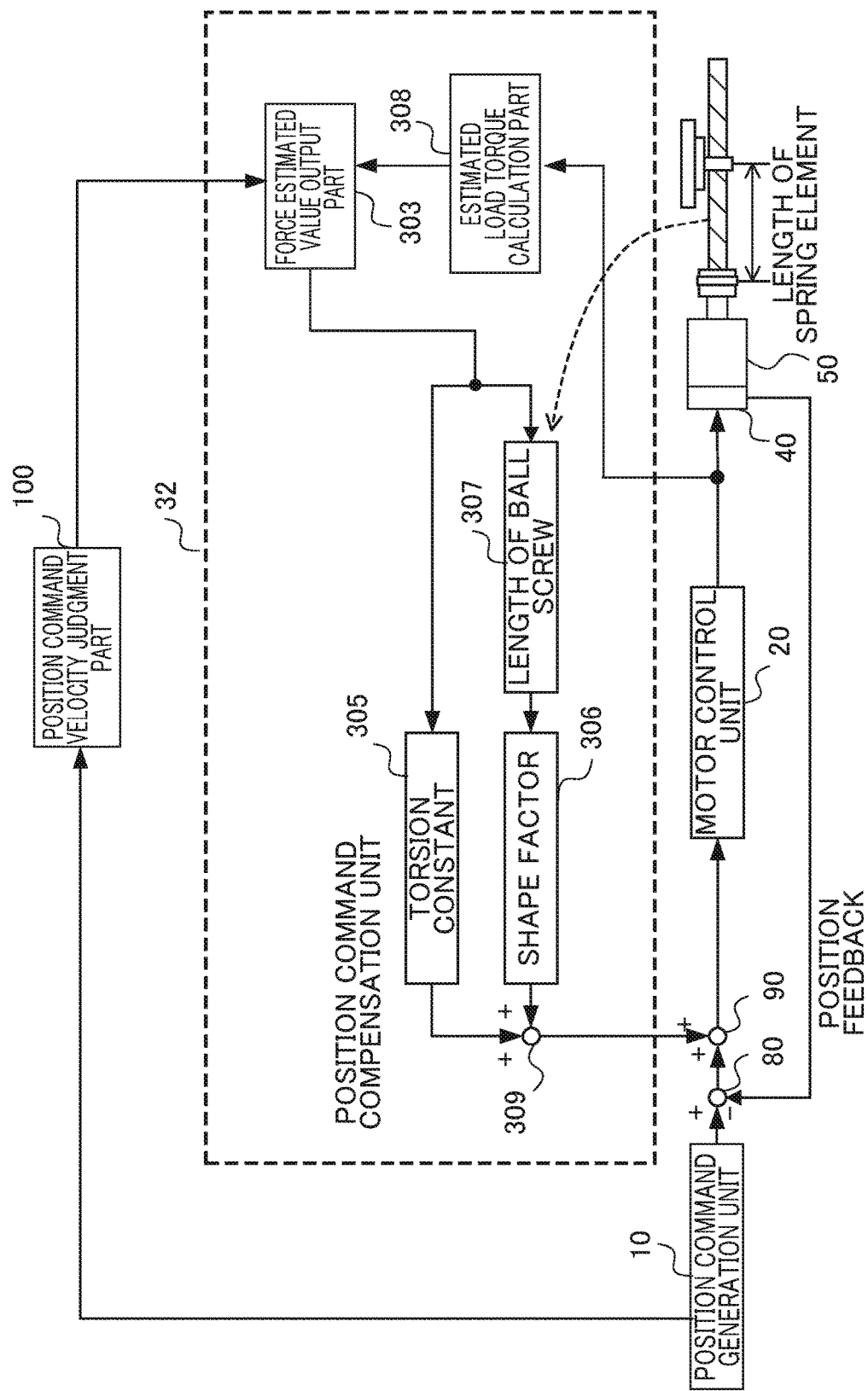
FIG. 8 is a block diagram showing the configuration of a servomotor control device including one configuration example of a position command compensation unit.

FIG. 8 is a block diagram showing the configuration of the servomotor control device including one configuration example of the position command compensation unit. The estimated load torque calculation part 308 of the position command compensation unit 32 in FIG. 8 corresponds to the force estimation part 302 in FIG. 3, and the torsion constant multiplication part 305, ball screw length multiplication part 307, shape factor multiplication part 306 and addition part 309 in FIG. 7 correspond to the compensation amount generation part 301 in FIG. 3. The shape factor indicates the expansion amount per unit length of the ball screw. In the present embodiment, the position command compensation unit 32 calculates the torsional elastic deformation around the rotation axis and the stretch/contraction elastic deformation in the axial direction occurring in the connection mechanism (coupling and ball screw), based on the load torque estimated or a fixed value, and compensates the lost motion caused by elastic deformation in the position command value. In this example, since the force estimated value output part 303 provided on the input side of the ball screw length multiplication part 307 performs the processing of interrupting the updating of the force estimated value, the position compensation amount can have dependency on the length of the ball screw. At this time, the elastic deformation in the axial direction depends on the distance from the servomotor 50 to the driven body, and this distance is estimated according to the integrated value of the movement position.

When indicating the estimated load torque as T and the torsion constant as $\alpha$, the compensation amount related to torsion of the coupling part becomes $\alpha \cdot T$, and when indicating the estimated load torque as T, length of the ball screw as d, and the shape factor as $\beta$, the compensation amount related to elongation of the ball screw becomes $d \times \beta \times T$. Then, the compensation amount that is the total from adding these compensations by the addition part 309 becomes $\alpha \times T + d \times \beta \times T$. The length d of the ball screw is the length of the ball screw from the servomotor 50 to the connecting part, and changes according to the position of the table.

Figure 9:
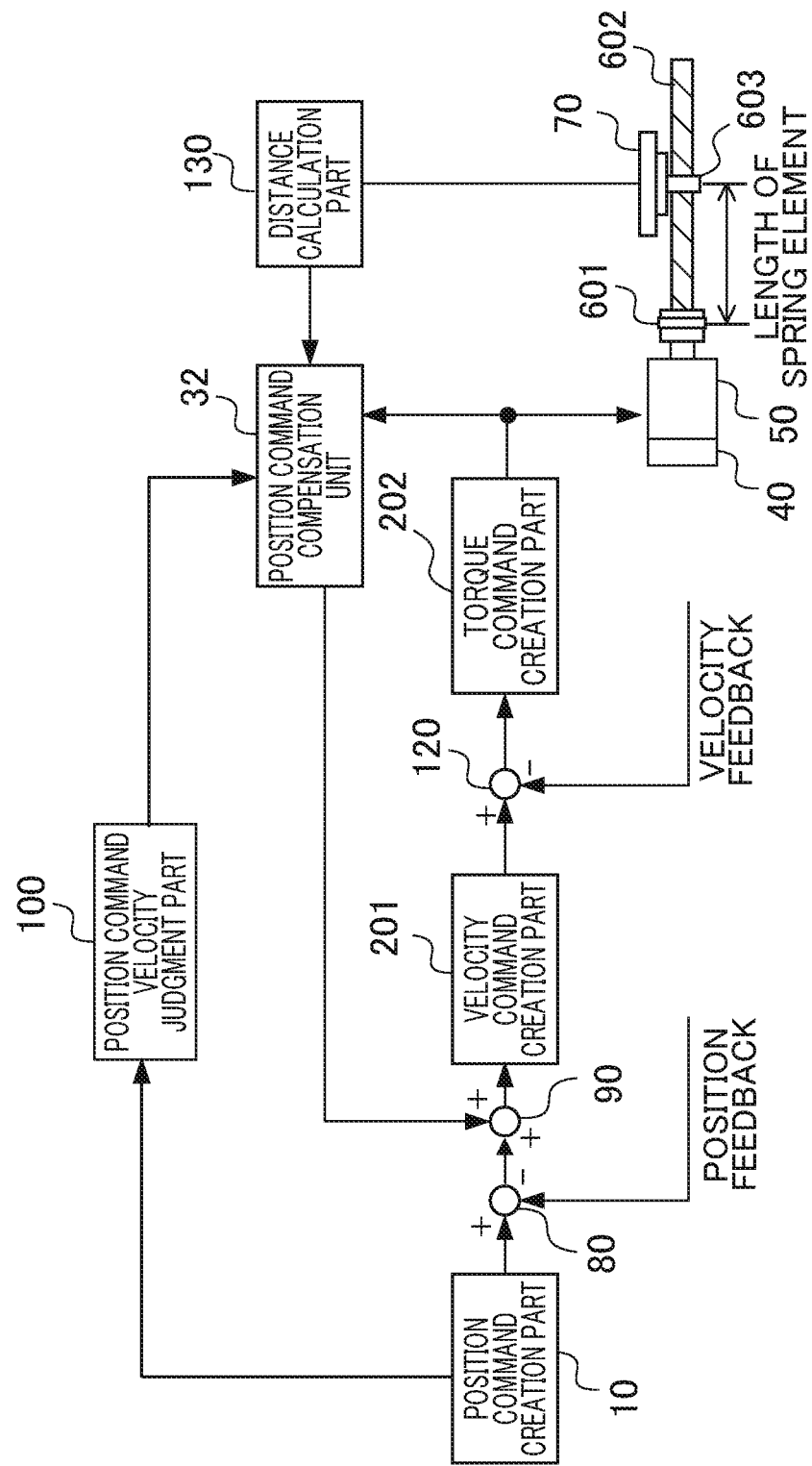
FIG. 9 is a block diagram showing one configuration example of a motor control unit and the configuration of a servomotor control device including a distance calculation part that obtains the length of a ball screw (length of spring element)

FIG. 9 is a block diagram showing one configuration example of the motor control unit 20 and the configuration of the servomotor control device including the distance calculation part 130 which obtains the length of the ball screw (length of spring element). The length of the ball screw (length of spring element) multiplied by the ball screw length multiplying part 307 in FIG. 8 is calculated by the distance calculation part 130. The motor control unit 20 in FIG. 8 has a velocity command creation part 201, subtraction part, and torque command creation part 202.

Figure 10:
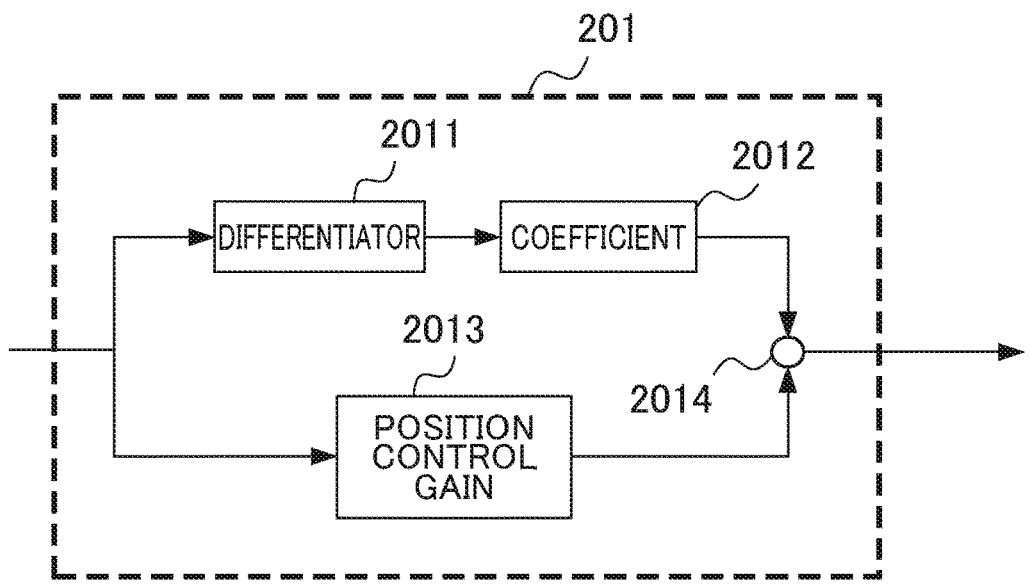
FIG. 10 is a block diagram showing one configuration example of a velocity command creation part.

FIG. 10 is a block diagram showing one configuration example of the velocity command creation part 201. As shown in FIG. 8, the position command generation unit 10 creates a position command value, the subtracter 80 obtains the difference between the position command value and the detected position that was position fed back, and the adder 90 adds the compensation amount to this difference. The difference to which the compensation amount was added is inputted to the differentiator 2011 and position control gain 2013, shown in FIG. 10. The coefficient part 2012 multiples the coefficient by the output of the differentiator 2011. The adder 2014 outputs the addition value of the output of the coefficient section 2012 and the position control gain 2013 as the velocity command value. The subtracter 120 obtains the difference from the detected velocity that was velocity fed back, and outputs this difference as the velocity command value.

Figure 11:
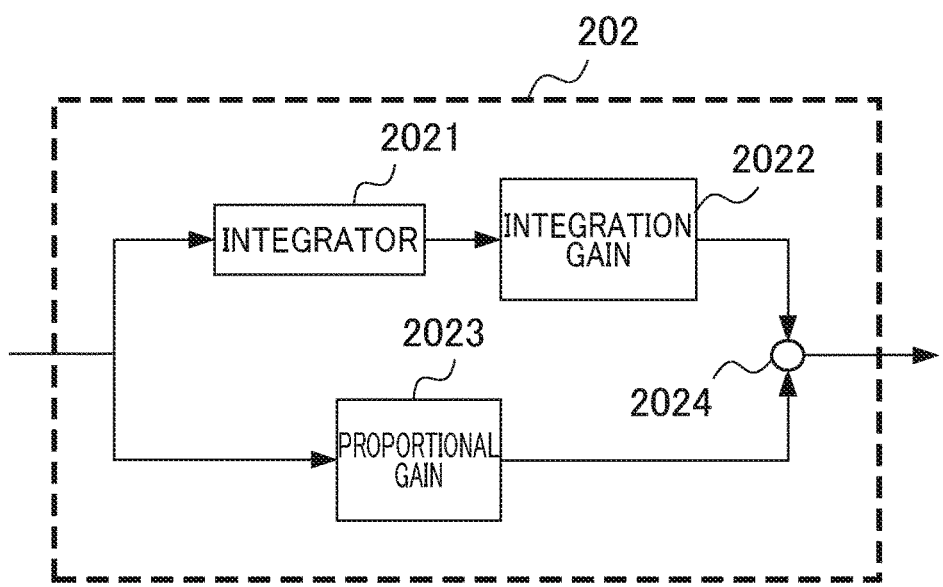
FIG. 11 is a block diagram showing one configuration example of a torque command creation part.

FIG. 11 is a block diagram showing one configuration example of the torque command creation part 202. The torque command creation part 202 includes a proportional gain 2023 and integrator 2021 connected with the subtracter 120, an integration gain 2022 connected with the integrator 2021, and an adder 2024 that adds the output of the proportional gain 2023 and the output of the integration gain 2022, and outputs to the servomotor 50 as the torque command. The integrator 2021 integrates the input. The integration gain 2022 multiplies a coefficient by the output of the integrator 2021, and the proportional gain 2023 multiplies a coefficient by the input. It should be noted that the integration gain 2022 and integrator 2021 may be changed in arrangement sequence.

Figure 12:
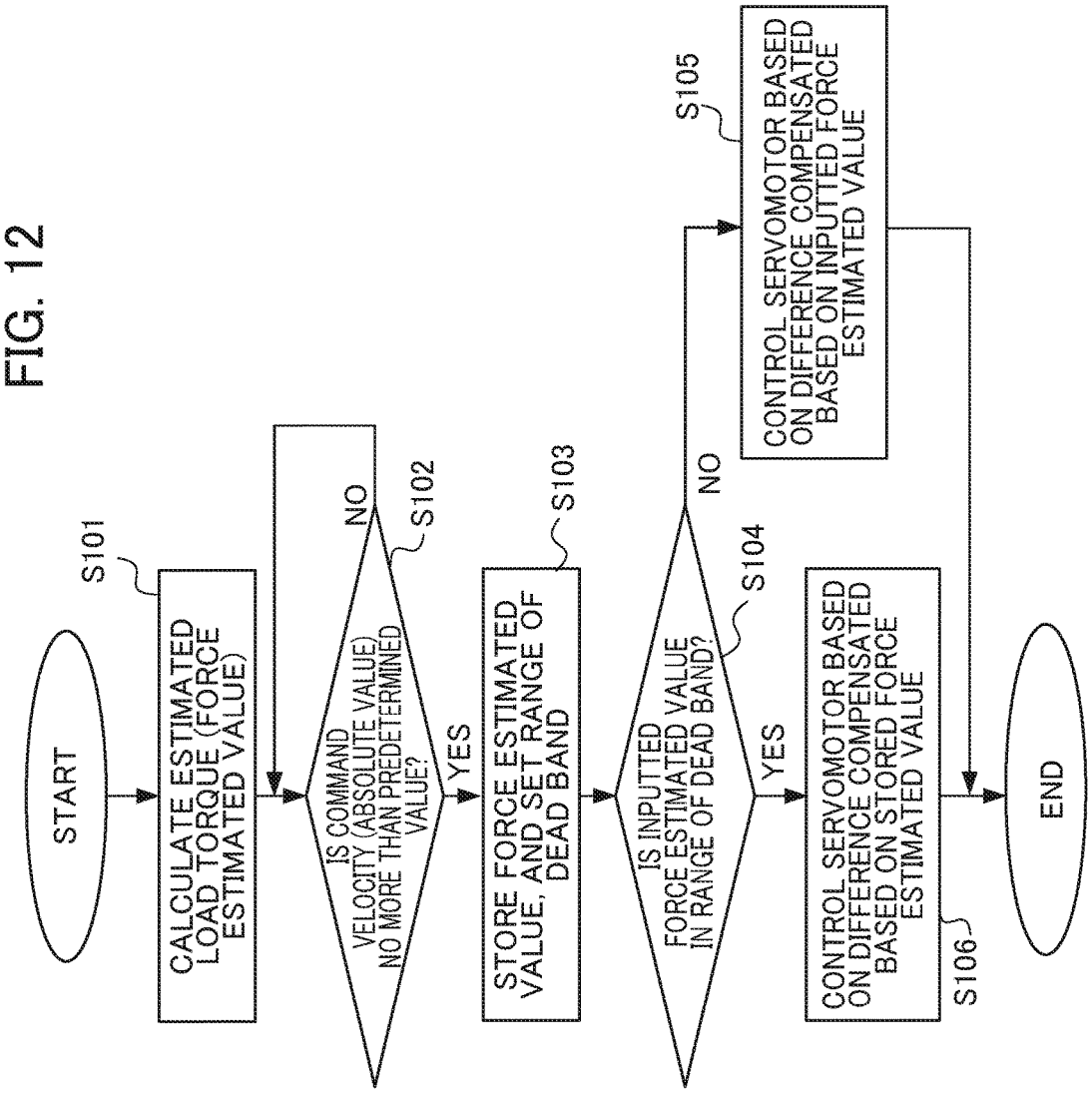
FIG. 12 is a flowchart showing operation of the servomotor control device shown in FIG. 3.

FIG. 12 is a flowchart showing the operation of the servomotor control device shown in FIG. 3. In Step S101, the force estimation part 302 calculates the estimated load torque (force estimated value). In Step S102, the position command velocity judgment part 100 judges whether the absolute value for the generated command velocity is no more than a predetermined value, and in the case of the absolute value for the command velocity being no more than the predetermined value (case of YES in Step S102), sends an instruction signal to the force estimated value output part 303. The storage section 3031 of the force estimated value output part 303 stores the force estimated value of when receiving the instruction signal, and the determination section 3032 sets the range of the dead band with a basis of the force estimated value when receiving the instruction signal (Step S103). On the other hand, the position command velocity judgment part 100, in the case of a judgment in which the absolute value for the command velocity cannot be no more than the predetermined value (case of NO in Step S102), returns the processing to Step S102.

In Step S104, the determination section 3032 determines whether the force estimated value subsequently inputted from the force estimation part 302 is in the set range of the dead band. In the case of the inputted force estimated value being in the set range of dead band (case of YES in Step S104), the determination section 3032 switches the switch 3033, and outputs the output instruction signal to the storage section 3031. In Step S106, the compensation amount generation part 301 generates a position compensation amount based on the load torque stored in the storage section 3031, and compensates the difference between the position command value from the position command generation unit 10 and the detected position of position feedback with the position compensation amount calculated by the compensation amount generation part 301. Then, the motor control unit 20 controls the servomotor 50 based on the compensated difference between the position command value and detected value. On the other hand, in the case of the inputted force estimated value not being in the set range of dead band (case of NO in Step S104), the determination section 3032 switches the switch 3033. As a result thereof, the force estimated value from the force estimation part 302 is outputted to the compensation amount generation part 301. In Step S105, the compensation amount generation part 301 generates a position compensation amount based on the force estimated value from the force estimation part 302, and outputs the position compensation amount to the adder 90. The adder 90 compensates the difference between the position command value from the position command generation unit 10 and the detected position of position feedback, with the position compensation amount calculated by the compensation amount generation part 301. Then, the motor control unit 20 controls the servomotor 50 based on the compensated difference between the position command value and detected position.

Second Embodiment

Figure 13:
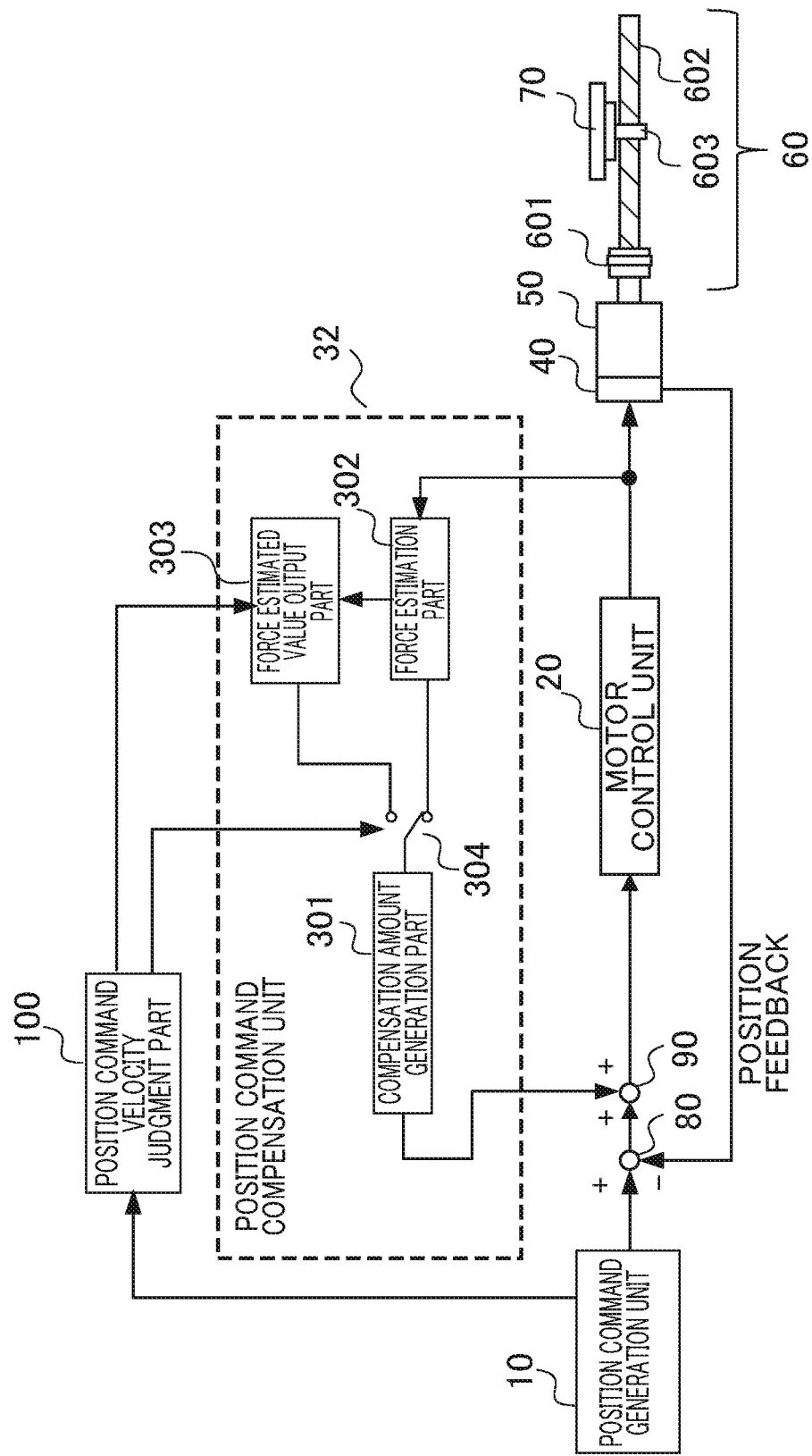
FIG. 13 is a block diagram showing the configuration of a servomotor control device serving as a second embodiment of the present invention.

FIG. 13 is a block diagram showing the configuration of a servomotor control device serving as a second embodiment of the present invention. As shown in FIG. 13, with the servomotor control device of the present embodiment, in the position command compensation unit 32, a switch 304 serving as the switching part is added to the position command compensation unit 31 of the servomotor control device shown in FIG. 3, and the switch 304 is switched according to a switching signal from the position command velocity judgment part 100.

The position command velocity judgment part 100, when the absolute value for the command velocity is no more than a predetermined value (including 0), sends a switching signal to the switch 304 so that the input terminal of the compensation amount generation part 301 is connected with the output terminal of the force estimated value output part 303. In addition, the position command velocity judgment part 100, when the absolute value for the command velocity exceeds a predetermined value, sends a switching signal to the switch 304 so that the input terminal of the compensation amount generation part 301 is connected with the output terminal of the force estimation part 302. The command acceleration of the position command value may be used in place of the command velocity of the position command value, and in this case, the position command velocity judgment part 100 is replaced with a position command acceleration judgment part that receives the position command value created by the position command generation unit 10, and generates a command acceleration for the position command value (position command acceleration). The functions of the position command acceleration judgment part are the same as the functions of the position command velocity judgment part 100, except for the point of replacing the command velocity with the command acceleration. In the present embodiment, when the absolute value for the command velocity exceeds a predetermined value, the position command velocity judgment part 100 switches the switch 304 so that the input terminal of the compensation amount generation part 301 is connected with the output terminal of the force estimation part 302. For this reason, it is possible to perform a switching operation rapidly, without performing judgment as to whether or not the force estimated value is in the predetermined force estimated value range, as in the first embodiment. Although the switch 304 is provided in the present embodiment, so long as configuring so that the determination section 3032 in FIG. 4 switches the switch 3033 and the input side of the compensation amount generation part 301 and output side of the force estimation part 302 are connected when the absolute value for the command velocity exceeds the predetermined value, the switch 304 may not necessarily be provided.

Third Embodiment

Figure 14:
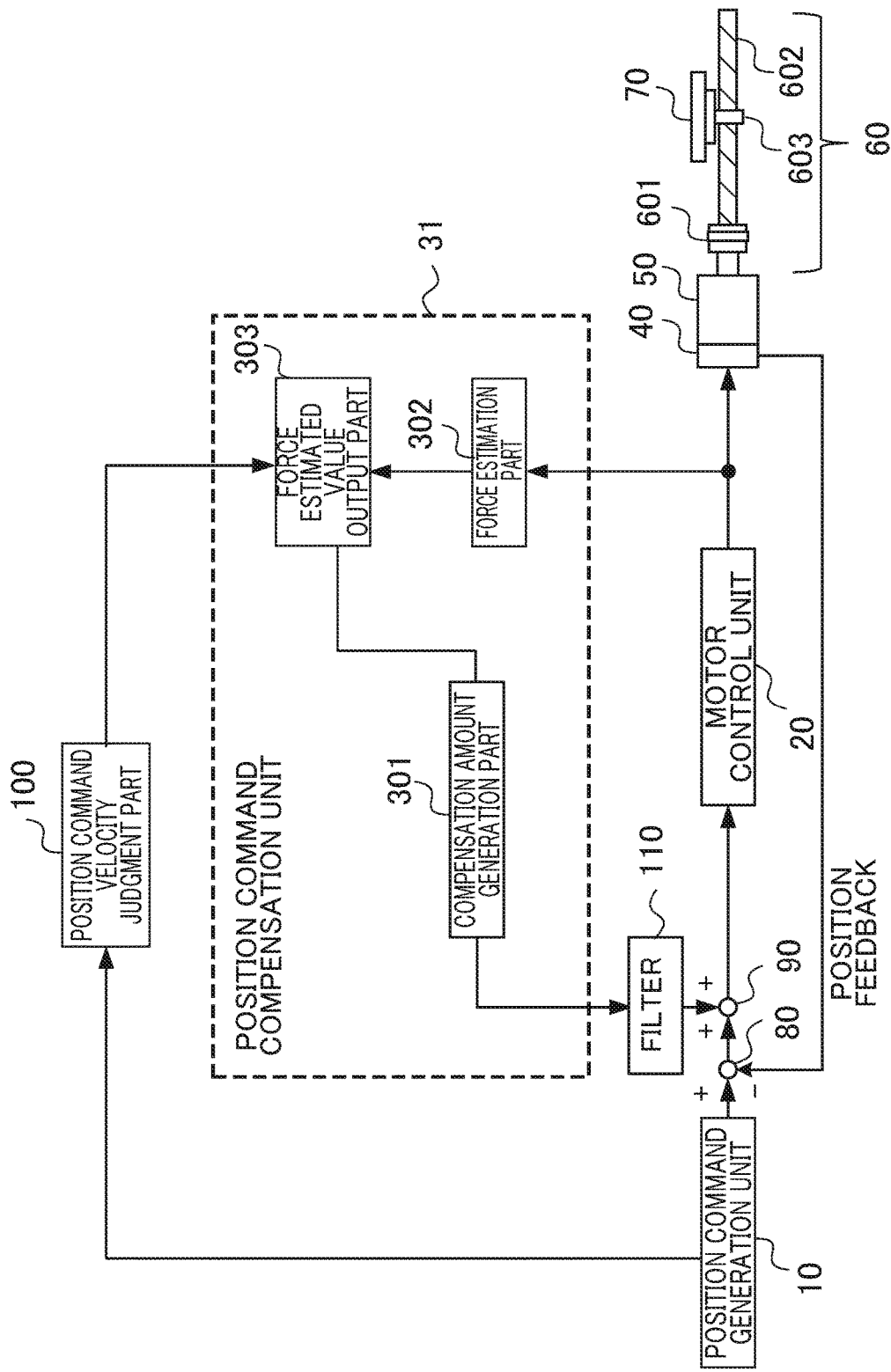
FIG. 14 is a block diagram showing the configuration of a servomotor control device serving as a third embodiment of the present invention.

In the servomotor control device of the first embodiment, when the determination section 3032 switches from the force estimated value from the force estimation part 302 to the force estimated value stored in the storage section 3031, or switches from the force estimated value stored in the storage section 3031 to the force estimated value from the force estimation part 302, the compensation amount may change discontinuously during switching. The discontinuous compensation amount becomes a discontinuous velocity command, and thus causes a discontinuous torque command to be produced. In order to prevent this discontinuity in compensation amount, a filter 110 is provided to the output of the position command compensation unit 31. By passing the compensation amount through the filter 110, a discontinuous value will be made to gently follow up. FIG. 14 is a block diagram showing the configuration of a servomotor control device serving as a third embodiment of the present invention. The configuration of the servomotor control device in FIG. 14 is the same as the configuration of the servomotor control device in FIG. 3 when excluding the point of the filter 110 being provided, and the same reference symbols will be attached for identical constituent elements, and explanations thereof will be omitted. The filter 110 can employ a low-pass filter.

Figure 15:
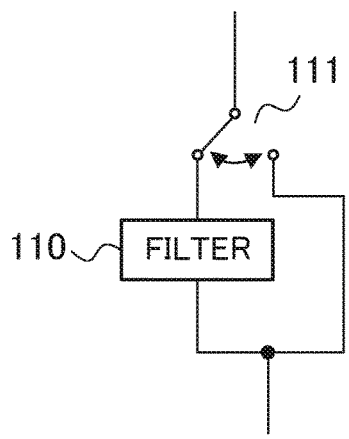
FIG. 15 is a view showing a filter and a selector switch of the filter.
Figure 16:
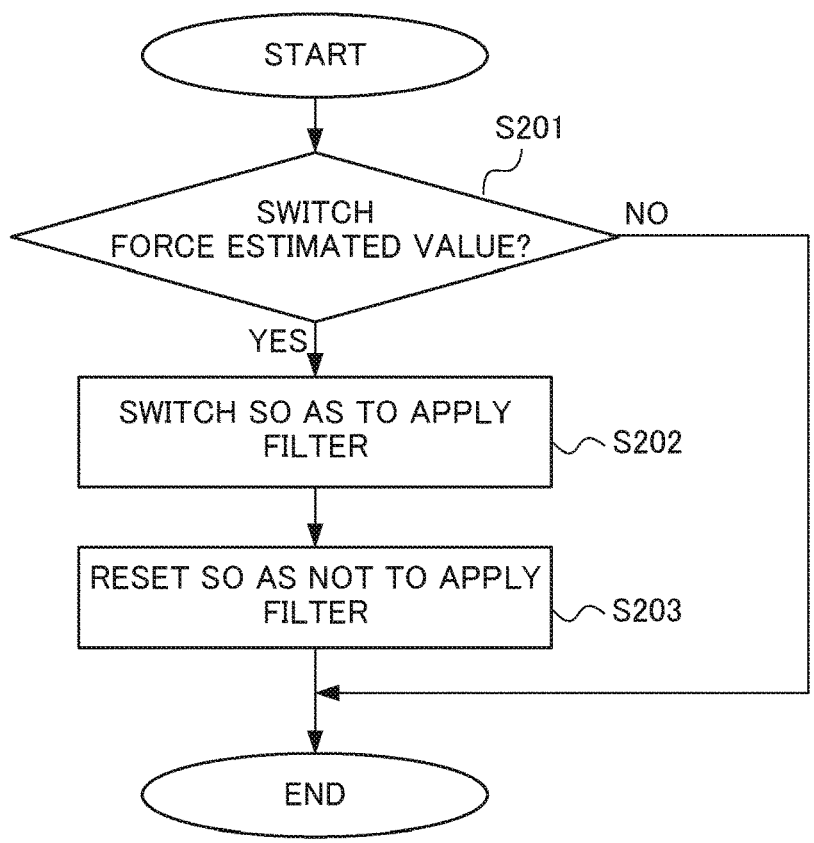
FIG. 16 is a flowchart showing a switching operation of filters by the selector switch.

As mentioned above, discontinuity in the compensation amount becomes preventable by connecting the filter 110 between the compensation amount generation part 301 and the adder 90. However, the selector switch 111 shown in FIG. 15 may switch between a case of not using the filter 110 and a case of using the filter 110. Only when the determination section 3032 switches from the force estimated value from the force estimation part 302 to the force estimated value stored in the storage section 3031 or switches from the force estimated value stored in the storage section 3031 to the force estimated value from the force estimation part 302 using the switch 3033, the selector switch 111 connects the filter 110 between the compensation amount generation part 301 and the adder 90. Then, after switching by way of the switch 3033, the selector switch 111 connects between the compensation amount generation part 301 and the adder 90 so as not to go through the filter 110. Switching of the selector switch 111 is performed based on the instruction signal from the determination section 3022 shown in FIG. 4. FIG. 16 is a flowchart showing a switching operation of the filter 110 by the selector switch 111. In Step S201, the determination section 3032 determines whether or not to switch the force estimated value, and in the case of switching the force estimated value (YES in Step S201), the selector switch 111 is switched so as to apply the filter in Step S202, and subsequently, when the discontinuity in the compensation amount has been eliminated, the selector switch 111 is switched so as not to apply the filter in Step S203. In the case of the determination section 3032 switching the force estimated value, there is a case of switching from the force estimated value from the force estimation part 302 to the force estimated value stored in the storage section 3031, and a case of switching from the force estimated value stored in the storage section 3031 to the force estimated value from the force estimation part 302.

Although the above explanation explains an example of adding the filter or the filter and selector switch to the configuration of the servomotor control device in FIG. 3, the filter or the filter and selector switch may be added to the servomotor control device in FIG. 13. In this case, there are two cases as cases of providing a filter. The first case is a case of the determination section 3032 switching from the force estimated value from the force estimation part 302 to the force estimated value stored in the storage section 3031, or switching from the force estimated value stored in the storage section 3031 to the force estimated value from the force estimation part 302, using the switch 3033. The second case is a case of the position command velocity judgment part 100 switching from the force estimated value from the force estimated value output part 303 to the force estimated value from the force estimation part 302, or switching from the force estimated value from the force estimation part 302 to the force estimated value from the force estimated value output part 303, using the switch 304. When adding the filter and selector switch, the switching of the selector switch 111 is performed based on the instruction signal by the determination section 3032 shown in FIG. 4 or position command velocity judgment part 100. The position command velocity judgment part 100 may be replaced with a position command acceleration judgment part that receives the position command value created by the position command generation unit 10, and generates a command acceleration for the position command value (position command acceleration).

Fourth Embodiment

With the servomotor control device of the third embodiment, although the filter 110 is provided to the output of the position command compensation unit 31 in order to prevent discontinuity in the compensation amount, it may be configured so that the torque command value becomes continuous by performing overwriting of the integrator 2021 of the torque command creation part 202 shown in FIG. 11, in place of the filter. In the present embodiment, both the overwriting of the integrator 2021 and the providing of the filter 110 to the output of the position command compensation unit 31 may be performed. If a compensation amount for compensating the position command value is inputted when the determination section 3032 uses the switch 3033 and switches from the force estimated value from the force estimation part 302 to the force estimated value stored in the storage section 3031, or switches from the force estimated value stored in the storage section 3031 to the force estimated value from the force estimation part 302, a change in velocity command value occurs. So that the torque command value does not change due to this change in velocity command value, it may be configured so that overwriting of the integrator is performed, and the torque command values becomes continuous.

Figure 17:
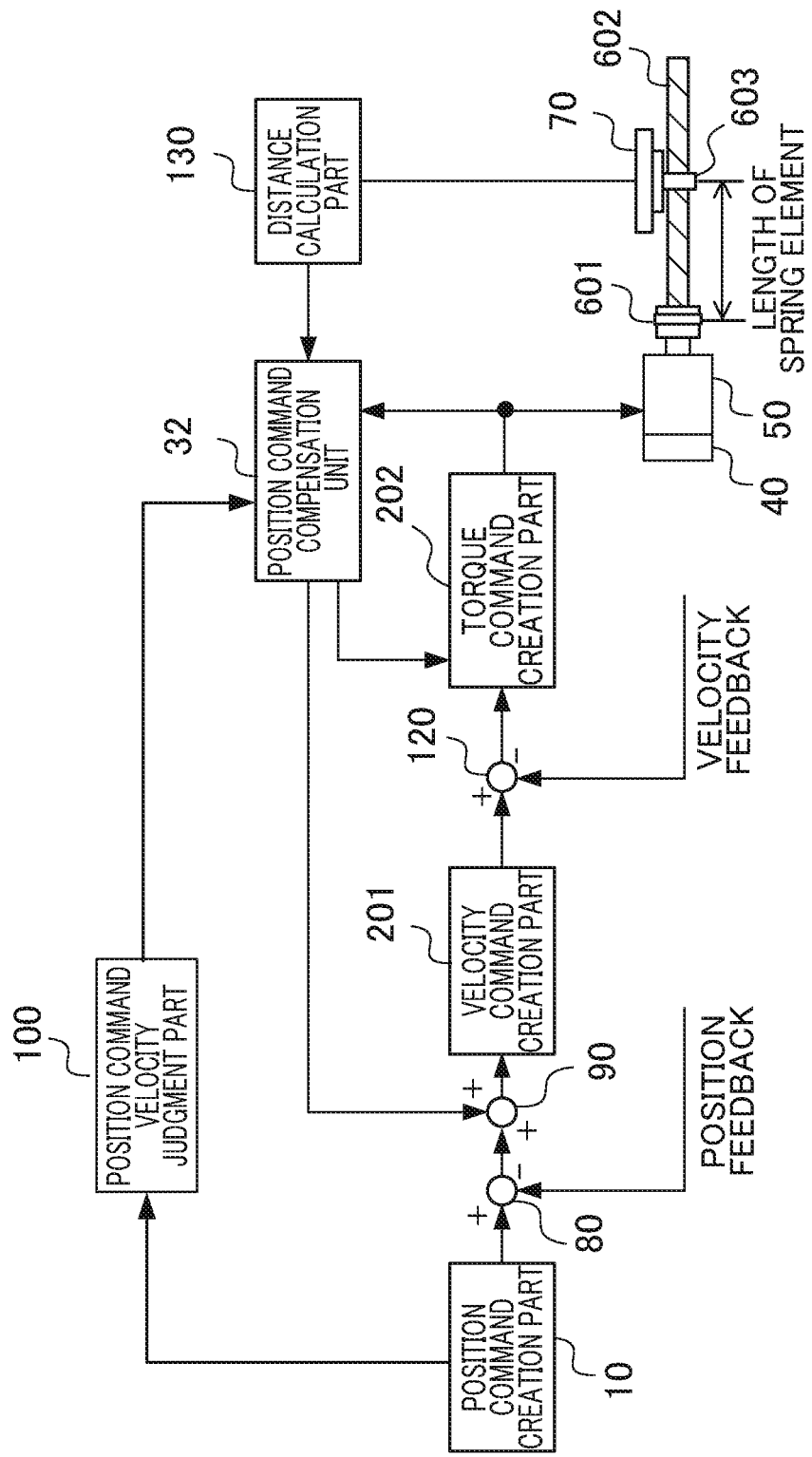
FIG. 17 is a block diagram showing the configuration of a servomotor control device serving as a fourth embodiment of the present invention.
Figure 18:
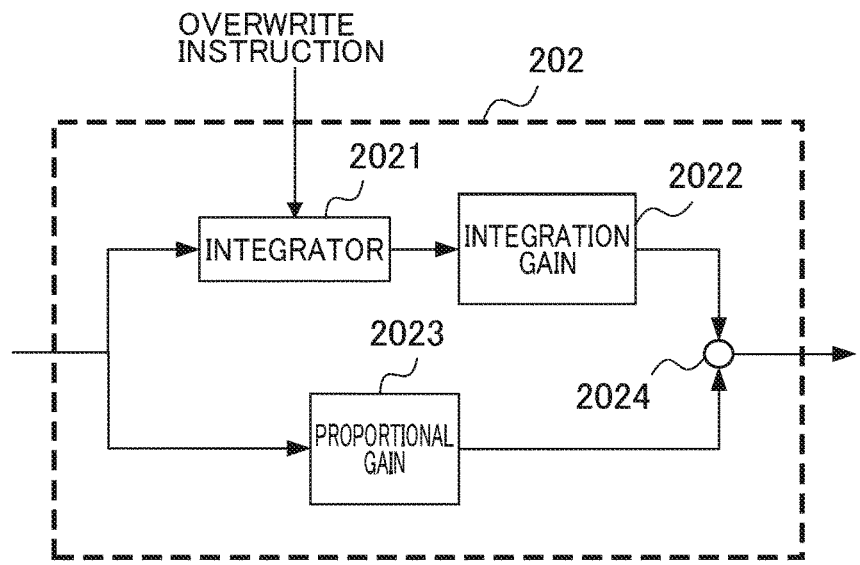
FIG. 18 is a block diagram showing the configuration of a torque command creation part.

FIG. 17 is a block diagram showing the configuration of a servomotor control device serving as a fourth embodiment of the present invention. The configuration of the servomotor control device in FIG. 17 is the same as the configuration of the servomotor control device in FIG. 9 when excluding the point of the determination section 3032 shown in FIG. 4 sending an overwrite instruction of the integrator to the torque command creation part 202, and thus the same reference symbols will be attached to identical constituent elements, and explanation thereof will be omitted. FIG. 18 is a block diagram showing the configuration of the torque command creation part 202. As shown in FIG. 18, the overwrite instruction is sent to the integrator 2021.

The overwrite instruction is sent when the determination section 3032 shown in FIG. 4 switches from the force estimated value from the force estimation part 302 to the force estimated value stored in the storage section 3031, or switches from the force estimated value stored in the storage section 3031 to the force estimated value from the force estimation part 302. The overwriting of the integrator 2021 is performed as follows based on the overwrite instruction. The torque command value TCMD is expressed by Formula 1, when defining Vcmd as the velocity command value, Vfb as the detected velocity, kp as the proportional gain, and ki and the integration gain.

$$TCMD = \Sigma(Vcmd - Vfb) \times ki + (Vcmd - Vfb) \times kp \quad \text{[Formula 1]}$$

When restarting the updating of the compensation amount from updating interrupt of the compensation amount, the torque command value TCMD becomes TCMD (2) from TCMD (1).

$$TCMD(1)=\Sigma(Vcmd(1)-Vfb(1))\times ki+(Vcmd(1)-Vfb(1))\times kp$$

$$TCMD(2)=\Sigma(Vcmd(2)-Vfb(2))\times ki+(Vcmd(2)-Vfb(2))\times kp=(TCMD(1)+(Vcmd(2)-Vfb(2)))\times ki+(Vcmd(2)-Vfb(2))\times kp \quad \text{[Formula 2]}$$

In the present embodiment, TCMD(1)+(Vcmd(2)−Vfb (2)) of the torque command value TCMD(2) is overwritten by the following Formula 3.

$$(TCMD(1)-(Vcmd(2)-Vfb(2))\times kp)/ki \quad \text{[Formula 3]}$$

When this is done, the overwritten torque command value TCMD'(2) is the same as TCMD(1), and discontinuity of the torque command does not arise.

Figure 19:
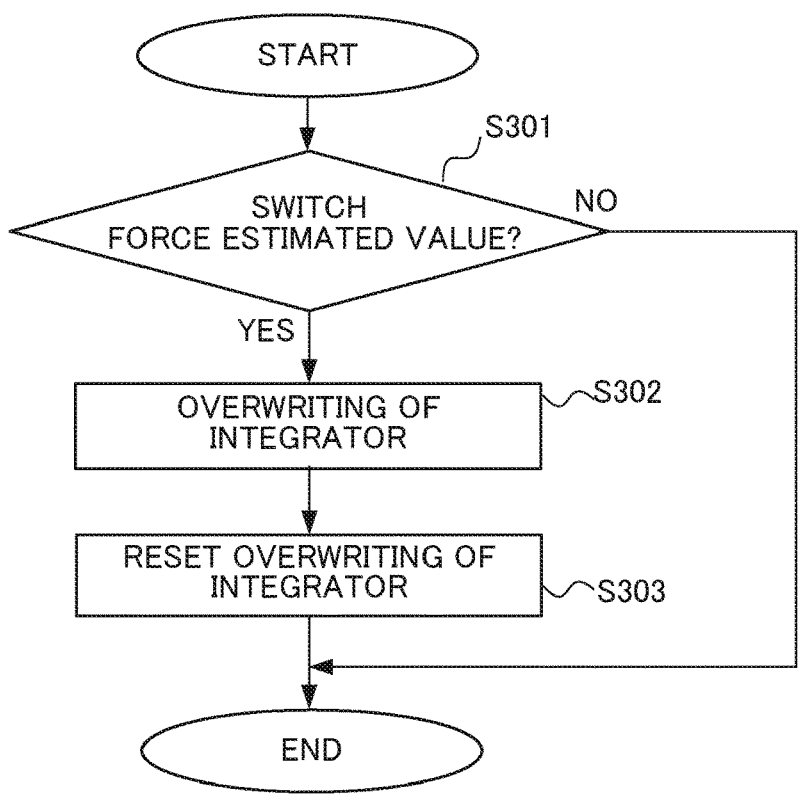
FIG. 19 is a flowcharting showing a switching operation of integrators.

FIG. 19 is a flowchart showing the switching operation of the integrator 2021. The determination section 3032 judges whether to switch the force estimated value in Step S301, and in the case of switching the force estimated value (YES in Step S301), performs overwrite of the integrator 2021 in Step S302. Subsequently, when discontinuity of the compensation amount is eliminated, the determination section 3032 resets overwriting of the integrator in Step S303. In the case of the determination section 3032 switching the force estimated value, there is a case of switching from the force estimated value from the force estimation part 302 to the force estimated value stored in the storage section 3031, and a case of switching from the force estimated value stored in the storage section 3031 to the force estimated value from the force estimation part 302.

The above explanation of the present embodiment explains an example of the configuration of the servomotor control device in FIG. 9 in which the determination section 3032 of the force estimated value output part 303 of the position command compensation unit 32 sends the overwrite instruction of the integrator to the torque command creation part 202; however, the configuration of the present embodiment can also be applied to a case of adding the position command velocity judgment part 100 and switch 304 of the servomotor control device in FIG. 13 to the configuration of the servomotor control device in FIG. 9. In this case, there are two cases as the case of sending the overwrite instruction of the integrator 2021. The first case is a case of the determination section 3032 switching from the force estimated value from the force estimation part 302 to the force estimated value stored in the storage section 3031, or switching from the force estimated value stored in the storage section 3031 to the force estimated value from the force estimation part 302, using the switch 3033. The second case is a case of the position command velocity judgment part 100 switching from the force estimated value from the force estimated value output part 303 to the force estimated value from the force estimation part 302, or switching from the force estimated value from the force estimation part 302 to the force estimated value from the force estimated value output part 303, using the switch 304.

The overwrite instruction of the integrator is performed based on the instruction signal by the determination section 3032 shown in FIG. 4 or position command velocity judgment part 100. The position command velocity judgment part 100 may be replaced with a position command acceleration determination part that receives the position command value created by the position command generation unit 10, and generates a command acceleration of the position command value (position command acceleration).

Although embodiments of the present invention have been explained above, the entirety or part of the functions of the servomotor control device can be realized by hardware, software or a combination of these. Herein, being realized by software indicates the matter of being realized by a computer reading out and executing programs. In the case of constituting by hardware, a part or the entirety of the compensation amount generation part 301, force estimation part 302, force estimated value output part 303, position command generation unit 10 and motor control unit 20 of the servomotor control device can be configured by circuits, e.g., integrated circuits (IC) such as LSI (Large Scale Integrated circuit), ASIC (Application Specific Integrated Circuit), gate array and FPGA (Field Programmable Gate Array).

In the case of being realized by software, a part of the entirety of the servomotor control device can be configured by a computer which includes a CPU, and storage units such as a hard disk and ROM storing programs. Then, by storing the information required in computation in a second storage unit such as RAM and a computer executing processing in accordance with the block diagrams of FIGS. 3, 4, and 8 to 11 and a program following the flowchart of FIG. 12, in accordance with a program following the block diagram of FIG. 13, or with the block diagrams of FIGS. 14 and 15 and a program following the flowchart of FIG. 16, or in accordance with the block diagrams of FIGS. 17 and 18 and a program following the flowchart of FIG. 19, it is possible to execute a part or the entirety of the operations of the servomotor control device. The programs can be read out into a storage unit such as a hard disk from an external storage medium such as CD-ROM, DVD or flash memory on which the programs are recorded.

The programs can be stored using various types of computer readable medium, and supplied to a computer. The computer readable recording medium includes various types of tangible storage medium, and includes non-transitory computer readable media. Examples of non-transitory computer-readable recording media include magnetic media (for example, flexible disk, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (Random Access Memory)).

The present invention is not to be limited to the aforementioned respective embodiments, and various changes and modifications thereto are possible.

EXPLANATION OF REFERENCE NUMERALS 10 position command generation unit
20 motor control unit
30, 31, 32, position command compensation unit
40 encoder
50 servomotor
60 connection mechanism
70 table
100 position command velocity judgment part 100
110 filter
301 compensation amount generation part
302 force estimation part
303 force estimated value output part
304 switch

What is claimed is:

1. A servomotor control device, comprising:
a servomotor;
a driven body configured to be driven by the servomotor;
a connection mechanism configured to connect the servomotor and the driven body to transfer power of the servomotor to the driven body;
a position command generation unit configured to generate a position command value for the driven body;
a motor control unit configured to control the servomotor using the position command value;
a force estimation unit configured to estimate a force estimated value which is drive force acting on the driven body at a connecting part with the connection mechanism;
a force estimated value output unit configured to define a predetermined force estimated value range, in a case of the command velocity of the position command value becoming no more than a predetermined value, with a basis of the force estimated value at this time, and if the force estimated value outputted from the force estimation unit is within the force estimated value range, outputting the force estimated value of when interrupting updating of the force estimated value, and if the force estimated value outputted from the force estimation unit is outside the force estimated value range, outputting a force command value reflecting updating of the force estimated value; and
a compensation amount generation unit configured to generate a compensation amount for compensating the position command value using output of the force estimated value output unit.

2. The servomotor control device according to claim 1, wherein the compensation amount generation unit defines, as the compensation amount, a sum of: a product of a first coefficient and the force estimated value outputted from the force estimated value output unit; and a product of the force estimated value outputted from the force estimated value output unit, a distance from the servomotor to the coupling part, and a second coefficient.

3. The servomotor control device according to claim 1, wherein the force estimated value range provides respectively different force estimated value ranges relative to increasing and decreasing directions of the force estimated value, with a basis of the force estimated value of when interrupting updating.

4. The servomotor control device according to claim 1, further comprising a switching unit configured to switch from the force estimated value outputted from the force estimated value output unit to a force estimated value which was estimated by the force estimation unit, in a case of a command velocity of the position command value generated by the position command generation unit exceeding a predetermined value.

5. The servomotor control device according to claim 1, wherein when the force estimated value output unit switches a force estimated value to be outputted, between a force estimated value reflecting updating and a force estimated value of when interrupting updating based on the position command value, or when the switching unit switches a force estimated value to be outputted, between a force estimated value outputted from the force estimated value output unit and a force estimated value outputted from the force estimation unit, a filter filters to the compensation amount generated by the compensation amount generation unit.

6. The servomotor control device according to claim 1, wherein the motor control unit includes a velocity command creation part and a torque command creation part,
wherein the torque command creation part has an integrator configured to integrate at least velocity error, and
wherein when the force estimated value output unit switches a force estimated value to be outputted, between a force estimated value reflecting updating and a force estimated value of when interrupting updating based on the position command value, or when the switching unit switches a force estimated value to be outputted between a force estimated value outputted from the force estimated value output unit and a force estimated value outputted from the force estimation unit, overwriting of the integrator is performed.

7. A servomotor control method for a servomotor control device including:
a servomotor;
a driven body configured to be driven by the servomotor; and
a connection mechanism configured to connect the servomotor and the driven body to transfer power of the servomotor to the driven body,
the method comprising:
a position command generation step of generating a position command value for the driven body;
a force estimation step of estimating a force estimated value which is a drive force acting on the driven body at a connecting part with the connection mechanism;
a force estimated value output step of defining a predetermined force estimated value range, in a case of the command velocity of the position command value generated in the position command generation step becoming no more than a predetermined value, with a basis of the force estimated value at this time, and if the force estimated value outputted in the force estimation step is within the force estimated value range, outputting the force estimated value of when interrupting updating of the force estimated value, and if the force estimated value outputted in the force estimation step is outside the force estimated value range, outputting a force command value reflecting updating of the force estimated value; and
a compensation amount generation step of generating a compensation amount for compensating the position command value, using the force command value outputted in the force estimated value output step,
wherein the servomotor is controlled using the position command value thus compensated.

8. A program for servomotor control that causes a computer to execute servomotor control of a servomotor control device including:
a servomotor;
a driven body configured to be driven by the servomotor; and
a connection mechanism configured to connect the servomotor and the driven body to transfer power of the servomotor to the driven body,
the program causing the computer to execute the steps according to claim 7.

* * * * *